United States Patent [19]

Jack et al.

[11] E Re. 28,884

[45] Reissued June 29, 1976

[54] WOODPULP BLEACHING PROCESS

[75] Inventors: Walter Q. Jack; Loyd V. Johnson, both of Tacoma, Wash.

[73] Assignee: Hooker Chemicals & Plastics Corporation, Niagara Falls, N.Y.

[22] Filed: July 2, 1975

[21] Appl. No.: 592,487

Related U.S. Patent Documents

Reissue of:

[64] Patent No.: 3,433,702
Issued: Mar. 18, 1969
Appl. No.: 467,697
Filed: June 28, 1965

[52] U.S. Cl. ..... 162/66; 8/108; 8/109; 162/67; 162/78; 162/88; 162/89

[51] Int. Cl.[2] ..... D21C 9/12; D21C 9/14

[58] Field of Search ..... 162/66, 67, 78, 88, 162/89, 90; 8/108, 111, 108.5, 109

[56] References Cited

UNITED STATES PATENTS

| | | | |
|---|---|---|---|
| 2,494,542 | 1/1950 | Casciani | 162/67 |
| 2,513,788 | 7/1950 | Day et al. | 162/89 X |
| 2,741,536 | 4/1956 | Stone | 8/108 X |
| 2,903,326 | 9/1959 | Heitman | 8/108 X |
| 3,020,197 | 2/1962 | Schuber | 162/89 X |

*Primary Examiner*—S. Leon Bashore
*Assistant Examiner*—Arthur L. Corbin
*Attorney, Agent, or Firm*—Peter F. Casella; William J. Crossetta, Jr.

[57] ABSTRACT

There is provided a process for the bleaching of woodpulp comprising reacting the pulp with chlorine dioxide until the chlorine dioxide is [at least partially] *more than 50%* depleted and, thereafter, *without an intermediate wash*, reacting the woodpulp with chlorine. [The process provides bleached pulps with excellent strength brightness, and color reversion properties.]

10 Claims, No Drawings

WOODPULP BLEACHING PROCESS

Matter enclosed in heavy brackets [ ] appears in the original patent but forms no part of this reissue specification; matter printed in italics indicates the additions made by reissue.

This invention relates to the bleaching of cellulosic materials and more particularly to a process of sequentially treating cellulosic materials with chlorine dioxide and chlorine in a manner whereby the color bodies, lignins and other impurities are more readily removed or brightened.

The bleaching of cellulosic materials, particularly woodpulp, has been the subject of extensive study and experimentation. As a result, many processes are known for effecting such bleaching operations and numerous of these processes are used in commercial bleaching operations. Various oxidizing reagents, such as chlorine, chlorine dioxide, alkali and alkaline earth hypochlorites, hydrogen peroxide, and the like have been suggested and used in specific processes wherein the reagent is applied to the cellulosic material in one or more steps.

The more common processes often use more than one reagent and more than one bleaching step. Some of these processes involve treating the cellulosic material with a reagent such as chlorine, washing the residual chlorine and solubilized impurities from the treated material with water, neutralizing or extracting the chlorinated lignins with caustic and washing with water, again treating the cellulosic materials with another reagent, such as chlorine, chlorine dioxide or sodium hypochlorite and again washing the residual reagent and solubilized impurities from the cellulosic material. Processes have been suggested wherein chlorine is used in the first bleaching stage or wherein chlorine dioxide is used in the first stage or wherein specific mixtures of chlorine dioxide and chlorine are used in the first stage. Each of these processes has various advantages and disadvantages in the treatment of the cellulosic material. The particular sequence and reagents used affect the brightness of the bleached material [ , ] *and* extent of fiber degradation and as a result, the fiber strength, brightness, resistance to loss of brightness on aging and overall economics of the process.

It is an object of the present invention to provide a method whereby the advantages of chlorine dioxide and chlorine can be incorporated into a process so that improved characteristics are obtained over previous processes utilizing chlorine dioxide and chlorine as a bleaching agent. Another object of this invention is to provide a process whereby improved brightness and improved resistance to loss of brightness on aging are obtained at an economic advantage. A further object of this invention is to provide a process particularly suited for the bleaching of woodpulp, utilizing conventional chlorine dioxide generating equipment as well as conventional bleaching equipment. These and other objects will become apparent to those skilled in the art from the description of the invention which follows.

In accordance with the invention, a process is provided for the bleaching of [ a cellulosic material ] *woodpulp* comprising [ treating ] *(a) reacting* [ cellulosic materials ] *woodpulp* with [ a bleaching agent selected from the group consisting of ] chlorine dioxide [ and chlorine, reacting said bleaching reagent with the cellulosic material until the reagent is at least partially depleted, and treating said cellulosic material, without an intermediate wash, with a second bleaching reagent, said bleaching reagent being other than the first bleaching reagent and being selected from the group consisting of chlorine dioxide and chlorine, reacting said reagent with said cellulosic material. ] *until said chlorine dioxide is more than 50% depleted and thereafter, without an intermediate wash, (b) reacting the woodpulp with chlorine, wherein (1) the woodpulp is dispersed in an aqueous slurry, which slurry, after being treated with said chlorine dioxide, is rendered neutral to acidic; (2) the temperature during said chlorine dioxide and chlorine reactions is maintained at from about 5 to about 100° centigrade; and (3) from about 2 to about 90% of the total available chlorine added is added as chlorine dioxide.* The process is preferably used as the only or first stage of a bleaching operation and, when used as the first stage bleaching operation, it is readily incorporated into conventional multistage bleach processes.

The process of this invention provides improved characteristics in the bleached material at equivalent available chlorine applications, compared to heretofore known processes, thereby providing an economic advantage. Although subsequent bleaching stages used in multistage bleaching operations and the particular bleaching reagents used in these stages affect the characteristics of the final bleached pulp, improved results are obtained using the method of this invention as the first stage with other normal bleaching sequences, in second, third or subsequent stages. Thus, where in the present invention chlorine dioxide is used as the first bleaching reagent and chlorine is used as the second bleaching reagent without an intermediate wash, followed by a caustic extraction, a further chlorine dioxide bleach, a further caustic extraction and a final chlorine dioxide bleach, superior results are obtained when compared to using a chlorine dioxide-chlorine mixture, pure chlorine or pure chlorine dioxide in the first stage followed by the same sequence. The total effect is that lesser amounts of chemicals can be used to obtain comparable brightness levels using the present method than with those previously proposed.

Although the present process is applicable to cellulosic materials in general, it is herein more specifically described in relation to the bleaching of woodpulp, such as that obtained from hemlock, Douglas fir, balsam, cedar, and the like. The woodpulp is generally first prepared for bleaching by any of the known processes, such as the kraft or sulfite processes, wherein the wood is pulped with partial removal of the lignin. Such processes also more completely expose the fibers, thereby providing more complete contact between the bleaching reagents and the fibers. The bleaching reagents used in the present process are actually reagents which act upon the impurities such as the color bodies and lignin contained in the cellulose material, thereby oxidizing or solubilizing the impurities so that they may be whitened or removed. Since chlorine dioxide and chlorine are gases under most operating conditions, they can be used as such to react on either the dry or wet cellulosic material. Also, the chlorine dioxide and chlorine can be passed into an aqueous dispersion of pulp or the like to therein react with the cellulosic material or they can be absorbed in aqueous solutions and added to the pulp in solution form. However, it is usually more convenient to have the pulp in an aqueous slurry and to add the reagents to the slurry. Thus, the prepared pulp is normally in an aqueous slurry which may be acidic, neutral or basic, and is directly bleached therein. Therefore the invention will be more completely described in relation to aqueous slurries of pulp.

In the present process, chlorine dioxide [ or ] *and* chlorine [ is ] *are* added in sequence to the pulp, such that first [ one reagent ] *chlorine dioxide* is added and reacted with the cellulosic material and then the [ second reagent ] *chlorine* is added and reacted without an intermediate washing step. Typically, chlorine dioxide is added and allowed to react for a period of time sufficient to at least partially deplete the chlorine dioxide, i.e., more than about 50 percent is depleted. Then, chlorine is added and reacted with the cellulosic material to complete the bleaching stage. After a reaction of sufficient time to produce the desired results, the residual reagent is washed from the pulp with water. Second, third or more bleaching stages may be applied, using conventional bleaching sequences in the additional bleaching stages. Thus, in the second, third or further stages, caustic, chlorine dioxide, chlorine, hypochlorite, peroxide or mixtures thereof can be used.

Although it is preferred to use the present method in the first stage of a bleaching operation, this process can also be used in a second or later stage or as the only bleaching stage. However, the present method is preferably used as the first stage of a multistage bleaching operation.

[ Either chlorine dioxide or chlorine can be used as the first added reagent, chlorine dioxide being preferred. ] The addition of [ the first bleaching reagent ] *chlorine dioxide* is preferably made in sufficient quantity so that a neutral to acidic pulp slurry is formed. Under such conditions, the bleaching action of the reagent is more effective. [ The second added reagent is either chlorine dioxide or chlorine, depending on which reagent was used first. ]

Since in commercial operations the chlorine dioxide may contain a small amount of chlorine due to the simultaneous release of chlorine during most chlorine dioxide generation processes, when it is stated herein that the cellulosic material is treated with chlorine dioxide, such a treatment is with a material which is primarily or substantially all chlorine dioxide but may contain some chlorine. In the same manner, the chlorine used is primarily or substantially all chlorine, but may contain some chlorine dioxide.

The bleaching time for each reagent in the process of this invention can vary, depending on the bleaching temperature, concentration of the reagents used, the specific characteristics desired in the bleached pulp and the percentage pulp dispersed in the aqueous solution. Thus, sufficient time is provided after each addition so that the reagent is reacted with the pulp, thereby at least partially depleting it prior to the addition of the second reagent. In most instances, the reagent is reacted to substantially or to almost completely deplete it prior to the next addition. At lower temperatures and lower concentrations of reagent, when the ultimate bleaching capacity of the reagent is to be utilized, longer bleaching times are used.

The total bleaching or reaction time for the process of this invention can be up to about three hours or more. Preferably, the reaction time will be from about five minutes to about two hours. Of this reaction time, it is preferred to react [ the first reagent ] *chlorine dioxide* for a shorter time than the [ second reagent ] *chlorine* . Thus, [ when ] *with* chlorine dioxide [ is ] *as* the first added reagent and chlorine [ is ] *as* the second added reagent, the reaction time for each reagent has been found to be preferably in a time ratio of a major proportion of the reaction time for the second reagent and a minor proportion of the reaction time for the first reagent, and more preferably, a reaction time ratio of the first reagent to the second reagent of about 1:2. Thus, in a one hour total reaction time in the first stage, [ if the ] chlorine dioxide [ is the first added reagent, it ] is reacted for about 20 minutes before the [ second reagent, ] chlorine [ , ] is added, it is best then to react the chlorine for about 40 minutes, at which time the chlorine is substantially depleted. [ In a like manner, when the chlorine is added first and the chlorine dioxide second, it is preferred to effect the reaction at a similar time ratio of first reagent to second reagent. ]

The temperature at which the solution is maintained during the bleaching operation can be varied from about five degrees centigrade up to about 100 degrees centigrade, but it is normally preferred to effect the bleaching operation in the temperature range of about 10 to 50 degrees centigrade. The speed of the bleaching reaction is accelerated at the higher temperatures.

The amount of total available chlorine added, whether the available chlorine is added as chlorine dioxide or as chlorine, can vary considerably depending upon the particular characteristics desired to be obtained as a result of the bleaching operation. Normally, 1 to about 10 percent of available chlorine, by weight of the cellulosic material, as measured by the percent consistency, is added and reacted with the cellulosic material in the present first stage bleaching process, the exact amount depending on the particular bleaching requirements. Available chlorine is a measure of the oxidizing power of the reagent using chlorine as the standard. As such, one part by weight of chlorine dioxide is equivalent to 2.63 parts by weight of chlorine. It has been found to be preferable to add 2 to 90 percent of the total available chlorine in the first phase addition and more preferably to add 20 to 80 percent of the total available chlorine based on the total available chlorine required in the bleaching stage.

The invention will be further described by reference to the examples which illustrate certain preferred embodiments of this invention. Unless otherwise indicated, all parts and percentages are by weight and all temperatures are in degrees centigrade.

EXAMPLES 1–3

These examples illustrate a comparison between the results obtained by the two phase chlorine dioxide-chlorine bleaching process of the present invention used as a first stage (Example 1) compared to a mixture of chlorine dioxide and chlorine used as the first stage (Example 2) and the use of chlorine alone as the first stage bleach (Example 3). The comparative examples were run in a five-stage bleaching operation, wherein the first stage of Example 1 was the method of the present invention, wherein in the first stage of Example 2 utilized a mixture of chlorine dioxide and chlorine and wherein the first stage of Example 3 used chlorine. The remaining bleaching stages for each example follow the same sequence of caustic extraction, chlorine dioxide addition, caustic extraction and final chlorine dioxide addition.

Each of the examples was run using equal parts of the same type of unbleached kraft pulp which consisted of 33 percent Douglas fir, 47 percent Western Hemlock and 20 percent cedar pulps. This pulp mixture had a permanganate number of 21.3, as measured by the Technical Association of Pulp and Paper Industries (TAPPI) Standard Testing Method No. T 214 m-50, and a chlorinated viscosity of 381 centipoises, as measured by the TAPPI Standard Testing Method No. T 203 su-63. The bleaching time for the first stage was a total of 60 minutes at a temperature of 20 degrees centigrade. In each example, a total of 7.0 percent available chlorine was added in the first stage. The chlorine and chlorine dioxide in each instance [ was ] *were* added as [ a gas ] *gases* which [ was ] *were* passed into the pulp slurry. Table I shows the result obtained.

TABLE I

| First Stage | Example Numbers 1 | 2 | 3 |
|---|---|---|---|
| Available $Cl_2$ ratio, $Cl_2$:$ClO_2$ | 23:77 | 23:77 | 100:0 |
| $ClO_2$ applied, % | 2.05 | 2.05 | 0 |
| $Cl_2$ applied, % | 1.61 | 1.61 | 7.0 |
| 1st phase, $ClO_2$ residual, % | 0.28 | — | — |
| 1st phase, $ClO_2^-$ residual, % | 0.14 | — | — |
| 1st phase terminal pH | 3.1 | — | — |
| End of stage $Cl_2$ residual, % | 0 | 0.68 | 0.31 |
| End of stage $ClO_2$ residual, % | 0 | 0 | 0 |
| End of stage $ClO_2^-$ residual, % | 0.19 | 0 | 0 |
| Total reaction time, minutes | 60 | 60 | 60 |
| Consistency,, % | 4.2 | 4.2 | 4.2 |
| Temperature, degrees centigrade | 20 | 20 | 20 |
| Second Stage | | | |
| NaOH applied, % | 3.0 | 3.0 | 3.0 |
| Final pH | 12.1 | 11.8 | 11.3 |
| Reaction time, minutes | 120 | 120 | 120 |
| After second stage reaction: | | | |
| Consistency, % | 9.8 | 9.8 | 9.8 |
| Temperature, degrees centigrade | 74 | 74 | 74 |
| Permanganate number | 2.3 | 3.8 | 3.6 |
| Viscosity, centipoises | 476 | 363 | 198 |
| Third Stage | | | |
| $ClO_2$ applied, % | 1.02 | 1.02 | 1.02 |
| $ClO_2$ consumed, % | 0.94 | 0.97 | 0.98 |
| NaOH applied, % | 0.52 | 0.52 | 0.47 |
| Final pH (after $ClO_2$ addition) | 4.0 | 3.7 | 3.0 |
| Reaction time, minutes | 180 | 180 | 180 |
| Consistency, % | 6.0 | 6.0 | 6.0 |
| Temperature, degrees centigrade | 74 | 74 | 74 |
| Viscosity (centipoises) | 380 | 347 | 210 |
| General Electric brightness | 85.4 | 78.7 | 80.5 |
| Meter Test, % (G.E.) | | | |
| G. E. brightness (1 hr. heat-aged), % | 81.3 | 75.8 | 77.6 |
| G. E. brightness (18 hr. heat-aged), % | 79.1 | 73.3 | 73.8 |
| Fourth Stage | | | |
| NaOH applied, % | 0.5 | 0.5 | 0.5 |
| Final pH (after NaOH addition) | 11.7 | 11.4 | 11.5 |
| Reaction time, minutes | 120 | 120 | 120 |
| Consistency, % | 10.8 | 10.8 | 10.8 |
| Temperature, degrees centigrade | 74 | 74 | 74 |
| Fifth Stage | | | |
| $ClO_2$ applied, % | 0.25 | 0.25 | 0.25 |
| $ClO_2$ consumed, % | 0.19 | 0.22 | 0.16 |
| Final pH | 4.0 | 3.7 | 3.5 |
| Reaction time, minutes | 240 | 240 | 240 |
| Consistency, % | 6.0 | 6.0 | 6.0 |
| Temperature, degrees centigrade | 74 | 74 | 74 |
| Total equivalent chlorine applied, % | 10.34 | 10.34 | 10.34 |
| Final Product Quality | | | |
| Viscosity, centipoises | 242 | 290 | 180 |
| G. E. brightness, % | 90.2 | 88.6 | 89.5 |
| G. E. brightness (1 hr. heat-aged), % | 87.1 | 86.5 | 87.7 |
| G. E. brightness (18 hr. heat-aged), % | 84.6 | 84.1 | 83.0 |
| Physical Strength at 250 milliliters Canadian Standard (ml. C.S.) freeness: | | | |
| Burst | 219 | 211 | 214 |
| Tear | 185 | 186 | 185 |
| Tensile | 13,600 | 13,750 | 13,000 |
| Double Folds | 6,100 | 5,500 | 5,300 |
| Beating time, minutes to reach 250 ml. C.S. | 68 | 70 | 61 |

Testing was carried out according to TAPPI Standard Testing Methods, wherein the General Electric (G.E.) Brightness was measured according to Standard Method T 217 m-48 and wherein the one hour heat-aged brightness test was carried out in a mechanical convection oven at 105 degrees centigrade for the indicated time. The physical tests were carried out according to TAPPI Standard Testing Methods T 200 ts-61, T 205 m-58, T 218 m-59, T 402 m-49 and T 220 m-60 wherein the burst strength is in pounds per square inch (p.s.i.) per pound per ream of 500–24 by 40 inch sheets times 100; the tear strength is in grams per pound per ream of 500–24 by 40 inch sheets times 100; the tensile is the breaking length measured in meters of paper [, ] and double folds is per pound per ream of 500–24 by 40 inch sheets times 100.

In Example 1, which illustrates the process of the present invention, the two phase addition employed a reaction time of 20 minutes for the addition of the first reagent, which was chlorine dioxide and a reaction time of 40 minutes for the addition of the second reagent, which was chlorine. A comparison of the data obtained illustrates the improved results obtained by the present method. Higher [ and ] third and fifth stage brightnesses are obtained by the two phase method. In addition, higher third and fifth stage viscosities are obtained, compared with normal chlorine treatment. The higher brightness of the final product obtained both before and after aging for an 18 hour period illustrates the superiority of the present process in producing superior product characteristics. The strength of the end product is equal to or better than that obtained when only chlorine was used as the bleaching reagent, as illustrated in Example 3 or that resulting when the bleaching reagent was a mixture as illustrated in Example 2.

EXAMPLES 4 [ through ] – 6

These examples compare the two-phase process of the present invention when used as the first stage of a six-stage bleaching process, with the use of a mixture of chlorine dioxide and chlorine in the first stage and the use of pure chlorine in the first stage. The comparisons were run using the same composition of kraft pulp as that used in Examples 1 through 3, dispersed in an aqueous phase. The results of the experiments are shown in Table II. Example 4 is a typical illustration of the use of chlorine as the bleaching reagent in the first stage. Example 5 shows two-phase chlorine dioxide-chlorine addition of the present invention, wherein the chlorine dioxide was reacted for 20 minutes prior to the addition of chlorine, which was then reacted for 40 minutes. Example 6 illustrates the use of a mixture of chlorine dioxide and chlorine in the first stage.

In all examples equivalent amounts of available chlorine were used. The available chlorine was added as a gas to the pulp slurries. The first stage operating temperature was 20 degrees centigrade and the total bleaching period for the first stage in Examples 4 through 6 was 60 minutes.

TABLE II

| | Example Numbers | | |
|---|---|---|---|
| | 4 | 5 | 6 |
| **First Stage** | | | |
| Available $Cl_2$ ratio, $Cl_2$:$ClO_2$ | 100:0 | 50:50 | 50:50 |
| $ClO_2$ applied, % | 0 | 1.33 | 1.33 |
| $Cl_2$ applied, % | 7.0 | 3.50 | 3.50 |
| 1st phase $ClO_2$ residual, % | — | 0 | — |
| 1st phase $ClO_2^-$ residual, % | — | 1.10 | — |
| 1st phase terminal pH | — | 3.1 | — |
| End of Stage $Cl_2$ residual, % | 0.47 | 0.16 | 0.28 |
| End of Stage $ClO_2$ residual, % | 0 | 0 | 0 |
| End of Stage $ClO_2^-$ residual, % | 0 | 0 | 0 |
| Total reaction time, minutes | 60 | 60 | 60 |
| Consistency, % | 4.2 | 4.2 | 4.2 |
| Temperature, degrees centigrade | 20 | 20 | 20 |
| **Second Stage** | | | |
| NaOH applied, % | 3.0 | 1.5 | 1.5 |
| Final pH | 12.1 | 10.3 | 10.1 |
| Reaction time, minutes | 120 | 120 | 120 |
| Consistency, % | 9.8 | 9.8 | 9.8 |
| Temperature, degrees centigrade | 74 | 48 | 48 |
| Permanganate number | 3.7 | 3.5 | 4.2 |
| Viscosity, centipoises | 200 | 437 | 389 |
| **Third Stage** | | | |
| $Ca(OCl)_2$ applied, % available $Cl_2$ | 1.30 | 1.30 | 1.30 |
| $Ca(OCl)_2$ consumed, % available $Cl_2$ | — | 1.19 | 1.28 |
| NaOH applied, % | 0.37 | 0.45 | 0.57 |
| Final pH | 10.1 | 9.5 | 10.3 |
| Reaction time, minutes | 180 | 180 | 180 |
| Consistency, % | 10.4 | 10.4 | 10.4 |
| Temperature, degrees centigrade | 35 | 35 | 35 |
| Viscosity, centipoises | 150 | 147 | 209 |
| G.E. brightness, % | 70.4 | 81.1 | 69.8 |
| G.E. brightness (1 hr. heat-aged), % | — | 74.6 | 66.9 |
| G.E. brightness (18 hr. heat-aged), % | — | 72.3 | 64.2 |
| **Fourth Stage** | | | |
| $ClO_2$ applied, % | 0.50 | 0.50 | 0.50 |
| $ClO_2$ consumed, % | 0.47 | 0.44 | 0.48 |
| Reaction time, minutes | 180 | 180 | 180 |
| Consistency, % | 6.0 | 6.0 | 6.0 |
| Temperature, degrees centigrade | 74 | 74 | 74 |
| Final pH | 3.9 | 4.1 | 3.1 |
| Viscosity, cp. | 120 | 148 | 202 |
| G.E. brightness, % | 83.0 | 88.1 | 83.8 |
| G.E. brightness (1 hr. heat-aged), % | — | 83.3 | 81.5 |
| G.E. brightness (18 hr. heat-aged), % | — | 80.0 | 77.6 |
| **Fifth Stage** | | | |
| NaOH applied, % | 0.50 | 0.50 | 0.50 |
| Final pH | 12.0 | 11.5 | 11.4 |
| Reaction time, minutes | 120 | 120 | 120 |
| Consistency, % | 10.8 | 10.8 | 10.8 |
| Temperature, degrees centigrade | 74 | 74 | 74 |

TABLE II-continued

| Sixth Stage | Example Numbers 4 | 5 | 6 |
|---|---|---|---|
| $ClO_2$ applied, % | 0.28 | 0.28 | 0.28 |
| $ClO_2$ consumed, % | 0.23 | 0.16 | 0.17 |
| Final pH | 5.9 | 4.2 | 4.9 |
| Reaction time, minutes | 240 | 240 | 240 |
| Consistency, % | 6.0 | 6.0 | 6.0 |
| Temperature, degrees centigrade | 74 | 74 | 74 |
| Total available [, ] $Cl_2$ applied, % | 10.35 | 10.35 | 10.35 |
| Product Quality | | | |
| Viscosity, cp. | 116 | 162 | 168 |
| G.E. brightness, % | 90.5 | 91.5 | 89.5 |
| G.E. brightness, (1 hr. heat-aged), % | 87.8 | 87.3 | 87.7 |
| G.E. brightness, (18 hr. heat-aged), % | 82.1 | 86.0 | 84.1 |

This comparison illustrates that by the total phase addition of the present invention, it was possible to use 1.5 percent less sodium hydroxide in the second stage than when all chlorine was used as a bleaching reagent. Also, the temperature of the second stage could be [operated] at 48 degrees centigrade instead of 74 degrees centigrade. This is particularly beneficial in commercial operations, due to the reduction in the chemical and steam requirements. The brightness in the third stage[, ] was 11 points higher with the two phase addition than that obtained with either the chlorine or the mixture. The fourth stage brightness was also 4 to 5 points higher with the two phase method and the final brightness after the sixth stage was again higher than that obtained with chlorine or the mixture. All [of] tests were run according to TAPPI Standard Testing methods as indicated in Examples 1–3.

[Examples] *Example* 7 [and 8]

[These examples compare two processes of the present invention. Example 7] *This example* shows chlorine dioxide employed as the first added reagent [and Example 8 shows chlorine employed as the fist added reagent]. The bleaching reaction was effected for a total period of 60 minutes, 20 minutes with the first added reagent and 40 minutes with the second added reagent. [In both instances] 7.7 [percent] *Percent* available chlorine was used. The ratio of reagents, based on the available chlorine added, was 85 percent chlorine dioxide to 15 percent chlorine. The [reactions were] *reaction was* run using [equal amounts of] unbleached kraft pulp consisting of about 70 percent hemlock and about 30 percent Douglas fir pulp.

The reaction temperature was 20 degrees centigrade. The pulp was treated in a five stage sequence wherein caustic extraction was used in the second stage, chlorine dioxide addition was used in the third stage, caustic extraction was used in the fourth stage and chlorine dioxide was added in the fifth stage.

TABLE III

| | [Example numbers] [7] | [8] |
|---|---|---|
| First Stage | | |
| Slurry pH at end of 1st phase | 3.0 | [1.9] |
| Slurry pH at end of 2nd phase | 2.0 | [2.0] |
| Viscosity, centipoises | 259 | [252] |

TABLE III-continued

| | [Example numbers] [7] | [8] |
|---|---|---|
| Third Stage | | |
| Viscosity, centipoises | 297 | [281] |
| Brightness,% | 80.6 | [80.2] |
| 1 hour heat-aged | 75.9 | [76.5] |
| 18 hour heat-aged | 73.7 | [72.6] |
| Fifth Stage | | |
| Viscosity | 256 | [243] |
| Brightness, % | 87.4 | [87.4] |
| 1 hour heat-aged | 85.4 | [85.0] |
| 18 hour heat-aged | 82.6 | [82.5] |

A comparative analysis of the viscosities and [brightness] *brightnesses*, both before heat-aging and after heat-aging, as shown in [these examples] *this example*, [compare] *compares* favorably with products resulting when either the chlorine dioxide or chlorine is added as the first phase.

Examples [9–14] *8–13*

These examples show the results obtained when various ratios of chlorine to chlorine dioxide are used in the two phase addition of the present invention. Compared with these changes in chlorine to chlorine dioxide ratios is the use of pure chlorine (Example [9] *8)* and pure chlorine dioxide (Example [14] *13*).

The experiments were run using unbleached kraft pulp consisting of 49 percent Western hemlock, 29 percent balsam, 12 percent Douglas fir and 10 percent cedar pulp. The permanganate number of this pulp was 20.2. The chlorited viscosity was 348 centipoises. Using equal amounts of pulp in an aqueous slurry, the available chlorine was added to the slurries as a gas. In Examples [10] *9* through [13] *12*, which illustrates the process of this invention, the $ClO_2$ was added first and reacted with the woodpulp for 20 minutes prior to the addition of chlorine, which was reacted for 40 minutes. In all of the examples, the reaction time in the first stage with the available chlorine was 60 minutes. Table IV shows the results obtained using the described first stage $Cl_2$:$ClO_2$ ratio in a four stage bleaching process. Available chlorine used in the first stage of each example was 6.5 percent based on the weight *of* pulp.

TABLE IV

| | Example Numbers | | | | | |
|---|---|---|---|---|---|---|
| | [9] *8* | [10] *9* | [11] *10* | [12] *11* | [13] *12* | [14] *13* |
| **First Stage** | | | | | | |
| Available $Cl_2$ ratio, $Cl_2$:$ClO_2$ | 100:0 | 80:20 | 60:40 | 40:60 | 20:80 | 0:100 |
| $ClO_2$ applied, % | 0 | 0.494 | 0.988 | 1.48 | 1.98 | 2.47 |
| $Cl_2$ applied, % | 650 | 5.20 | 3.90 | 2.60 | 1.30 | 0 |
| 1st phase terminal pH | — | 5.9 | 4.1 | 3.2 | 3.1 | — |
| 2nd phase terminal pH | 2.0 | 2.1 | 2.3 | 2.3 | 2.4 | 2.6 |
| Viscosity, centipoises | 147 | 191 | 192 | 179 | 201 | 265 |
| **Second Stage** | | | | | | |
| NaOH applied, % | 3.5 | 3.5 | 3.5 | 3.5 | 3.5 | 3.5 |
| Viscosity, centipoises | 210 | 289 | 238 | 272 | 267 | 292 |
| Permanganate number | 3.8 | 2.5 | 1.8 | 2.1 | 2.8 | 4.8 |
| **Third Stage** | | | | | | |
| NaOCl applied, % available $Cl_2$ | 1.0 | 1.0 | 1.0 | 1.0 | 1.0 | 1.0 |
| Viscosity, centipoises | 184 | 211 | 181 | 147 | 185 | 243 |
| G.E. brightness, % | 60.8 | 67.4 | 71.5 | 75.5 | 70.6 | 59.5 |
| G.E. brightness, % (18 hr. heat-aged) | 55.6 | 60.7 | 65.0 | 68.8 | 64.2 | 55.0 |
| **Fourth Stage** | | | | | | |
| $ClO_2$ applied, % | 0.55 | 0.55 | 0.55 | 0.55 | 0.55 | 0.55 |
| Viscosity, centipoises | 187 | 195 | 175 | 145 | 204 | 238 |
| G. E. brightness, % | 81.6 | 82.2 | 84.8 | 85.2 | 83.4 | 72.3 |
| G. E. brightness, % (1 hr. heat-aged) | 79.4 | 80.4 | 81.8 | 82.5 | 80.8 | 70.6 |
| G. E. brightness, % (18 hr. heat-aged) | 75.2 | 77.0 | 79.2 | 80.1 | 78.6 | 68.1 |

An analysis of the example results shows that improved pulp characteristics are obtained at each of the chlorine to chlorine dioxide ratios of the present invention compared to either chlorine alone or chlorine dioxide alone. Also shown is that a 60:40 chlorine to chlorine dioxide ratio produces the lowest permanganate number with the pulp used. Third and fourth stage brightness and heat-aged brightness are highest at a ratio of about 40:60 $Cl_2$:$ClO_2$ and in all comparable instances are better than either the pure chlorine of Example [9] *8* or the pure chlorine dioxide of Example [14] *13*.

What is claimed is:

1. A process for the bleaching of woodpulp, comprising:

(a) reacting woodpulp with chlorine dioxide until said chlorine dioxide is [at least partially] *more than 50 percent* depleted and [,] thereafter, *without an intermediate wash*, (b) reacting the woodpulp with chlorine, wherein (1) the woodpulp is dispersed in an aqueous slurry, which slurry, after being treated with said chlorine dioxide, is rendered neutral to acidic;

(2) the temperature during said chlorine dioxide and chlorine reactions is maintained at from about 5 to about 100 degrees centigrade; and (3) from about 2 to about 90 percent of the total available chlorine added is added as chlorine dioxide.

2. The process of claim 1, wherein:

(a) from 1 to about 10 percent (by weight of woodpulp) of available chlorine is provided by the chlorine and chlorine dioxide; and (b) the total reaction time for said process is up to about three hours.

3. The process of claim 2, wherein:

(a) from about 20 to about 80 percent of the total available chlorine is added as chlorine dioxide;

(b) the chlorine dioxide is reacted with the woodpulp for from two to about 75 minutes; and (c) the chlorine is reacted with the woodpulp for from about two minutes to two hours.

4. The process of claim 3, wherein:

(a) the total reaction time for said process is from about 5 minutes to about two hours; and (b) the chlorine is reacted approximately twice as long as is the chlorine dioxide.

*5. The process of claim 4, wherein:*

*(a) the total reaction time for said process is about one hour;*

*(b) the chlorine dioxide is reacted with the woodpulp for about twenty minutes; and*

*(c) the chlorine is reacted with the treated woodpulp in the same stage for about 40 minutes.*

*6. The process of claim 5, wherein:*

*(a) the sequential chlorine dioxide and chlorine bleaching in the same stage is effected in the first bleaching stage; and*

*(b) such stage is followed by a washing, a caustic treatment and at least one additional bleaching stage wherein the bleaching agent is selected from the group consisting of chlorine dioxide, chlorine, hypochlorite, peroxide and mixtures thereof.*

*7. The process of claim 6, wherein:*

*(a) a total of about 7 percent of available chlorine is added in the first stage, with about 77 percent thereof being from chlorine dioxide and the balance being from chlorine;*

*(b) the reaction temperature is at about 10 to about 50 degrees centigrade in the first stage;*

*(c) caustic treatment is effected with sodium hydroxide in a second stage; and*

*(d) said treatment is followed by a third stage chlorine dioxide bleach, a fourth stage sodium hydroxide extraction and a fifth stage chlorine dioxide bleach.*

*8. The process of claim 1, wherein:*

*(a) the sequential chlorine dioxide and chlorine bleachings are effected in a first bleaching stage; and*

*(b) such stage is followed by a caustic extraction and at least one additional bleaching stage wherein the bleaching agent is selected from the group consisting of chlorine dioxide, chlorine, hypochlorite, peroxide and mixtures thereof.*

*9. A process of claim 8, wherein:*

(a) *the caustic extraction after the first stage sequential chlorine dioxide and chlorine bleachings is effected with sodium hydroxide; and*

(b) *said extraction is followed by a plurality of bleaching stages and sodium hydroxide extraction stages intermediate said bleaching stages.*

*10. The process of claim 9, wherein:*

(a) *a total of about 7 percent of available chlorine is added in the first stage;*

(b) *the chlorine reaction time is greater than the chlorine dioxide reaction time; and*

(c) *the reaction temperature is at about 10 to 50 degrees centigrade in said stage.*

* * * * *

UNITED STATES PATENT OFFICE
CERTIFICATE OF CORRECTION

PATENT NO Re 28,884

DATED : June 29, 1976

INVENTOR(S) : Walter Q. Jack and Loyd V. Johnson

It is certified that error appears in the above-identified patent and that said Letters Patent are hereby corrected as shown below:

Column 9, line 17, "total phase" should read ---two phase---. Column 11, line 3, "650" should read ---6.50---; line 46, "slurry" should read ---slurry,; line 48, "dioxide," should read ---dioxide,.

Signed and Sealed this

Twenty-second Day of February 1977

[SEAL]

*Attest:*

RUTH C. MASON
*Attesting Officer*

C. MARSHALL DANN
*Commissioner of Patents and Trademarks*